US006734854B1

(12) United States Patent
Shimizu

(10) Patent No.: US 6,734,854 B1
(45) Date of Patent: May 11, 2004

(54) IMAGE PROCESSING METHOD AND STORAGE MEDIUM FOR STORING IMAGE PROCESSING PROGRAMS

(75) Inventor: Yusuke Shimizu, Tokyo (JP)

(73) Assignee: Sega Enterprises, Ltd., Tokyo (JP)

( * ) Notice: Subject to any disclaimer, the term of this patent is extended or adjusted under 35 U.S.C. 154(b) by 0 days.

(21) Appl. No.: 09/328,187

(22) Filed: Jun. 9, 1999

(30) Foreign Application Priority Data

Jun. 22, 1998 (JP) .......................................... 10-175158

(51) Int. Cl.$^7$ .............................................. G06T 15/00
(52) U.S. Cl. ...................................................... 345/422
(58) Field of Search ................................ 345/420, 421, 345/422, 619, 620, 419

(56) References Cited

U.S. PATENT DOCUMENTS

| | | | | |
|---|---|---|---|---|
| 6,222,552 B1 | * | 4/2001 | Haas et al. .................. | 345/422 |
| 6,226,000 B1 | * | 5/2001 | Richens et al. ............. | 345/419 |
| 6,259,452 B1 | * | 7/2001 | Coorg et al. ................ | 345/421 |
| 6,266,068 B1 | * | 7/2001 | Kang et al. .................. | 345/629 |
| 6,313,839 B1 | * | 11/2001 | Larson ........................ | 345/422 |

OTHER PUBLICATIONS

Foley et al. (Computer Graphic—Principles and Practice), Addison–Wesley Publishing Company, Inc. 1996, pp. 668–672.*

* cited by examiner

*Primary Examiner*—Phu K. Nguyen
(74) *Attorney, Agent, or Firm*—Dickstein Shapiro Morin & Oshinsky LLP

(57) ABSTRACT

An image processing method whereby an image of object generated in real time in a pre-generated background image by giving operators an impression of depth or distance can be synthesized and a storage medium for storing the image processing program are provided. In the present invention, image data of a pre-generated image, such as a background image, includes image data, which is texture data or color data, and Z data indicating a depth in a screen. Then, the data of the pre-generated image like a background image is recorded on a storage medium in advance. The Z data of real timely generated image is compared with the Z data of the background image, and the image data, which is foremost in the screen, is written in a frame buffer. It becomes possible to synthesize the image of real timely generated object in the background image with giving an impression of depth or distance by adding the Z data to the data of pre-generated image.

18 Claims, 12 Drawing Sheets

Second diagram for showing texture buffer and texture Z buffer of background image
(Example for reduction)

First explanatory diagram of subjects
of the present invention

Background image

Object

Conventional synthesized image

Second explanatory diagram of subjects of the present invention

Schematic structural example of game device

Flowchart of image processing

Example of drawing commands

First diagram for showing texture buffer and texture Z buffer of background image
(Example for enlargement)

Second diagram for showing texture buffer and texture Z buffer of background image
(Example for reduction)

Zooming-in and zooming-out

Background image (texture data)

Z data (displacement from Z0)

Example of using plural background images

Example of using plural background images

IMAGE PROCESSING METHOD AND STORAGE MEDIUM FOR STORING IMAGE PROCESSING PROGRAMS

BACKGROUND OF THE INVENTION

1. Field of the Invention

The present invention relates to an image processing method for synthesizing a second image real timely generated in a first image generated in advance, such as a background image, during game or simulation progression, and more particularly, to an image processing method and a storage medium for storing an image processing programs whereby a more realistic image can be generated by giving operators an impression of depth to the first image without increasing times of calculation.

2. Description of the Related Art

Image processing technology for synthesizing an image of object generated in real time in a pre-generated background image is widely used in simulation devices and game devices. The pre-generated image means a non-moving picture or moving picture generated by a computer graphics technique, movie picture, an image generated by animation or the like, for example. Since it takes much time to calculate for generating these images in real time by a computer, a pre-generated static or frame image is recorded and employed as a texture of background polygon.

That will be now explained in an example of computer graphics. For generating a background image in advance, a background picture is modeled by employing a computer, and the modeled data is subject to a rendering process so as to generate color data in each pixel of static picture, at first. The color data is recorded in a texture buffer of an image processing device as texture data, and the texture data recorded in the texture buffer is drawn as color data for the background polygon, which is one of plain polygons. A background image including plural objects, such as buildings, trees, or mountains, can be treated as one polygon, thus it makes possible to reduce the calculation time extensively.

However, in the above-described method, when synthesizing objects, which move in real time, to the background image, the objects are synthesized on the background image. Therefore, the synthesized image lacks the impression of depth and distance.

FIGS. 1A to 1D are explanatory diagrams of the above-described conventional problems of synthesized image. FIG. 1A shows an example of pre-generated background image. In the example, two buildings B1 and B2 are arranged along a depth direction in a display screen. FIG. 1B shows an example of image of real timely generated object. In FIG. 1B, a building B3, which is slightly on a right side from a center, is placed between the buildings B1 and B2. FIG. 1C shows an image obtained by synthesizing the background image shown in FIG. 1A and the image of object shown in FIG. 1B according to the conventional method.

Since the background image is processed as one plain polygon according to the conventional method, there is no depth in screen in the image. Therefore, in the conventional method, the real timely generated object B3 including a depth value (Z value) is simply synthesized on the background image. Then, the conventional synthesized image shown in FIG. 1C has no impression of depth, and therefore, the building B3 is positioned in front of the building B1, thus the synthesized image is much different from a real image.

Therefore, it is an object of the present invention to provide an image processing method wherein the real timely generated object B3 can be synchronized between the buildings B1 and B2 in the background image, as shown by a synthesized image in FIG. 1D.

It is possible to imitatively generate a synthesized image as shown in FIG. 1D by processing the objects B1 and B2 in the background image, each having a different depth value, as different plain polygons, even in the conventional method. However, the use of conventional method means that all of plural objects in the background image are processed by different plain polygons, such process results in a longer computer calculation time, and therefore, the conventional method can not be used because it is not suitable for a real time image processing. The present invention rigidly has a condition that calculation times for the background image are reduced by treating the background image as one or few plain polygons. The object of the present invention is to give an impression of distance to the synthesized image, when the real timely generated object is synthesized to the background image under such condition.

FIG. 2 shows an explanation diagram of the conventional problem of the synthesized image. In the example of FIG. 2, a wall W1 is foremost, a wall 2 is rearmost, and a wall W3, which extends along a depth direction connecting to these walls W1 and W2, is further arranged in a display screen 10. A tunnel T1 is formed on the wall W3. In the above-described conventional method, it is impossible to generate a synthesized image such that a real timely synthesized movable object OB1, such as a car, enters the tunnel T1 on the wall W3. In other words, it is impossible to generate an image such that the polygon of the other object enters into a plain polygon (W3), if the background image W3 is treated as one plain polygon and a uniform depth value, e.g., an infinite value, is given to the plain polygon. Additionally, even if the walls W1, W2 and W3 are processed in respective plain polygons, it is impossible to synthesize the real timely generated object OB1 entered in the wall W3, if the uniform depth value is given to the plain polygon for the wall W3.

SUMMARY OF THE INVENTION

Therefore, it is an object of the present invention to provide an image processing method wherein it is possible to synthesize such that a real timely generated object OB1 is entered in a background image formed of walls W1, W2, W3, and a tunnel T1, as shown in FIG. 2.

It is another object of the present invention to provide an image processing method wherein when synthesizing a real timely generated image in a pre-generated image, the image can be synthesized to the pre-generated image with giving an impression of depth, without increasing loads to image processing, and to provide a storage medium storing the image processing program.

It is a still further object of the present invention to provide an image processing method wherein when synthesizing a real timely generated image in a pre-generated image, the real timely generated image can be synthesized as entering at a certain portion along a depth direction in the pre-generated image, without increasing loads to image processing, and to provide a storage medium storing the image processing program.

It is a furthermore object of the present invention to provide an image processing method wherein a pre-generated image is arranged on an optional position in a screen, and further, a real timely generated image can be synthesized in the screen with giving an impression of distance or as the image enters at a certain position along a depth direction in the pre-generated image, and to provide a storage medium storing the image processing program.

To achieve the above-described objects, in the present invention, image data of a pre-generated image, such as a background image, includes image data, which is texture data or color data, and Z data indicating a depth in a screen. Then, the data of the pre-generated image like a background image is recorded on a storage medium in advance. The Z data of real timely generated image is compared with the Z data of the background image, and the image data, which is foremost in the screen, is written in a frame buffer. It becomes possible to synthesize the image of real timely generated object in the background image with giving an impression of depth or distance by adding the Z data to the data of pre-generated image.

To achieve the above-described objects, in the present invention, an image processing method for synthesizing a pre-generated first image with a real-timely generated second image, wherein texture data and texture Z data indicating a depth in a screen are pre-generated in a predetermined pixel unit as data of the first image, comprising a step of: recording in a frame buffer data of the first image or the second image which is foremost in the screen, according to the Z data indicating a depth in the screen of the second image and the texture Z data at a corresponding pixel position in the screen.

According to the above-described invention, it becomes possible to synthesize the real-timely generated second image in the first image with giving an impression of depth or distance by including the Z data in the data of first image, such as a background image.

To achieve the above-described objects, in the present invention, an image processing method for synthesizing a pre-generated first image with a real-timely generated second image, in which a Z buffer for recording Z data indicating a depth in a screen of an image to be displayed is used, and Z data of an image to be processed is compared with Z data stored in the Z buffer so as to record the image data to be processed, which is foremost in the screen in a frame buffer, comprising the steps of:

(a) recording data of the pre-generated first image having first image data and first Z data indicating a depth in the screen in each predetermined pixel unit in a first buffer;

(b) comparing the Z data stored in the Z buffer with the first Z data stored in the first buffer and drawing the first image data stored in the first buffer at a predetermined position in the frame buffer, when the first image is foremost in the screen; and (c) comparing the Z data stored in the Z buffer with a second Z data of the second image and drawing a second image data of the second image at a predetermined position in the frame buffer, when the second image is foremost in the screen.

According to the present invention, since data of the pre-generated image, such as a background image, is recorded in the first buffer first, a desired portion of the pre-generated image can be recorded in the frame buffer with a desired size. Additionally, the image data of the second image, which is foremost in the screen, can be written in the frame buffer by comparing the Z data of the written image with the Z data of the real-timely generated second image. Therefore, it can be realized to synthesize the second image in the first image with giving an impression of depth. Either the above-described steps (b) or (c) may be executed first.

To achieve the above-described objects, in the present invention, an image processing method for synthesizing a pre-generated first image with a real-timely generated second image, in which a Z buffer for recording Z data indicating a depth in a screen of image to be displayed is used, and the Z data of pixel to be processed is compared with the Z data recorded in the Z buffer so as to record the image data, which is foremost in the screen, in a frame buffer, comprising the steps of:

(a) recording data of the pre-generated first image having texture data and texture Z data indicating a depth in the screen in each predetermined pixel unit in a texture buffer;

(b) comparing the Z data recorded in the Z buffer with the Z data of the first image generated from the texture Z data, in response to an instruction of drawing the first image, and recording the first image data generated from the texture data in the frame buffer, when the pixel to be processed of the first image is foremost in the screen; and (c) in response to an instruction of drawing a polygon forming the second image, comparing the Z data recorded in the Z buffer with the Z data of pixel in the polygon, and recording the second image data of the polygon at a corresponding position in the frame buffer, when the pixel in the polygon is foremost in the screen.

The above-described objects can be also achieved by a storage device recording a program for instructing a computer to execute the above-described image processing method.

BRIEF DESCRIPTION OF THE PRESENT INVENTION

DESCRIPTION OF THE PREFERRED EMBODIMENTS

Hereinafter, preferred embodiments of the present invention are described with reference to the attached drawings. However, the technical scope of the present invention is not limited to these embodiments. Although the present invention can be applied to an image processing method in a game or simulation device, an example of game device will be explained in the following embodiments. Additionally, although a first image is not limited to a background image, but is an image which is not changed in real time in response to input operation, an example of a background image will be now explained in the following embodiments.

Figure 3:
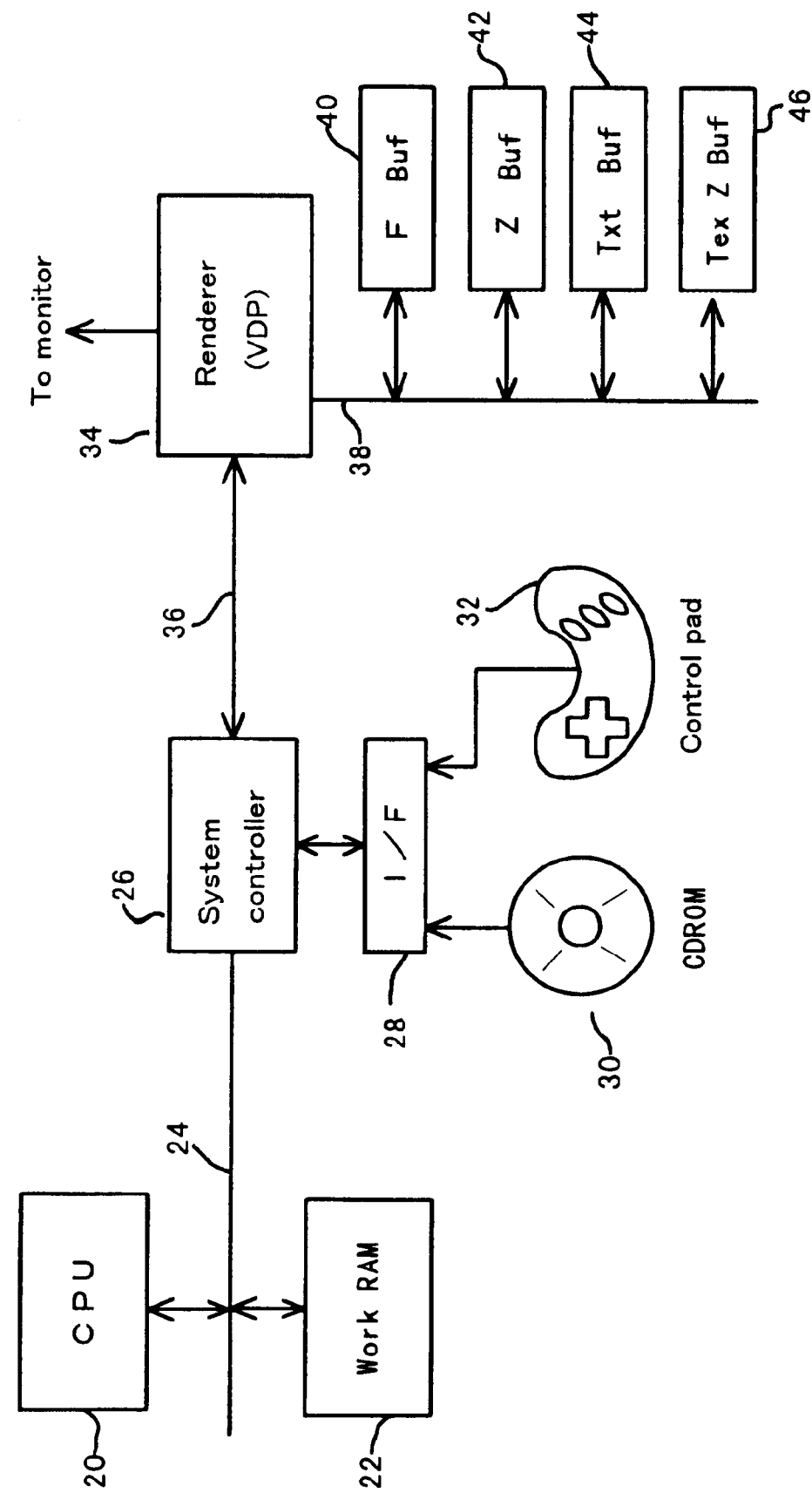
FIG. 3 shows a schematic structural example of a game device.

FIG. 3 is a schematic structural diagram of a game device. In the game device shown in FIG. 3, a CPU 20 executes a game program and issues drawing commands for generating images changed in synchronized with a game progression. The CPU 20 is connected to a work RAM 22 for the use on the game program execution via a bus 24.

The bus 24 is connected to a system controller 26, which is an interface between the CPU 20 and a renderer 34 that draws images. The system controller 26 transfers the drawing commands or the other commands issued from the CPU 20 to the renderer 34. The system controller 26 is connected to an external interface 28, so as to be connected to an external storage medium 30, such as a CD-ROM, in which a game program and data of objects required for the game are recorded, and to a control pad 32 for inputting operations.

The renderer 34 for drawing the image composed by a video digital processor, for example, is connected to a frame buffer 40, a Z data buffer 42, a texture buffer memory 44, and a texture Z buffer memory 46, via a bus 38. The renderer 34 respectively stores the texture data and the texture Z data in the texture buffer 44 and the texture Z buffer 46, in response to the drawing commands and the other commands transmitted from the CPU 20 via the system controller 26, stores the image data to be drawn to the frame buffer 40, and stores the Z data indicating a depth in the screen of pixel to be drawn at a corresponding position in the Z data buffer 42. After finishing storing the image data for one frame in the frame buffer 40, the renderer 34 transfers the stored image data to a monitor, not shown in the diagram, and displays the image of the game on the monitor screen.

The texture buffer memory 44 records texture data of the object usually generated in real time and texture data of the pre-generated background image. The feature of the present embodiment is that the pre-generated background image is stored in the texture buffer 44, and the Z data indicating the depth in the screen of the background image is also stored in the texture Z buffer 46. The texture data and texture Z data of the pre-generated background image are stored in the external storage medium 30, such as a CD-ROM. The system controller 26 reads out the texture data and the texture Z data of the background image stored in the CD-ROM 30, and stores them in the work RAM 22. Then, the CPU 20 decompresses the data, supplies them to the renderer 34 via the system controller 26. The renderer 34 stores the data in the texture buffer 44 and the texture Z buffer 46, respectively.

After that, the CPU 20 provides the drawing commands for the background image to the renderer 34, and the renderer 34 reads out the texture data of the background image stored in the texture buffer, in response to the drawing commands, executes a predetermined rendering process, and stores the image data composed by generated color data in the frame buffer 40. At this time, the renderer 34 also stores the texture Z data read out from the texture Z buffer memory 46 in the Z data buffer 42. Operations input by a player of the game device are input from a control pad 32 to the work RAM 22 via the system controller 26. In response to the operation input, the CPU 20 executes the game program, issues the drawing commands of the real-timely generated object, and supplies them to the renderer 34. In response to the drawing commands, the renderer 34 writes the image data of the object which is foremost in the screen at a corresponding position of the frame buffer 40, through a process of comparing the Z data stored in the Z data buffer 42 with the Z data of pixel in drawing process, i.e., a hidden surface deletion process.

Generally speaking, the hidden surface deletion process due to the comparison of the z data can be executed in the rendering process for drawing the real-timely generated object, by adding the texture Z data to the texture data of the background image, thus making it possible to synthesize the real-timely generated object in the background image with giving an impression of depth or distance.

Figure 4:
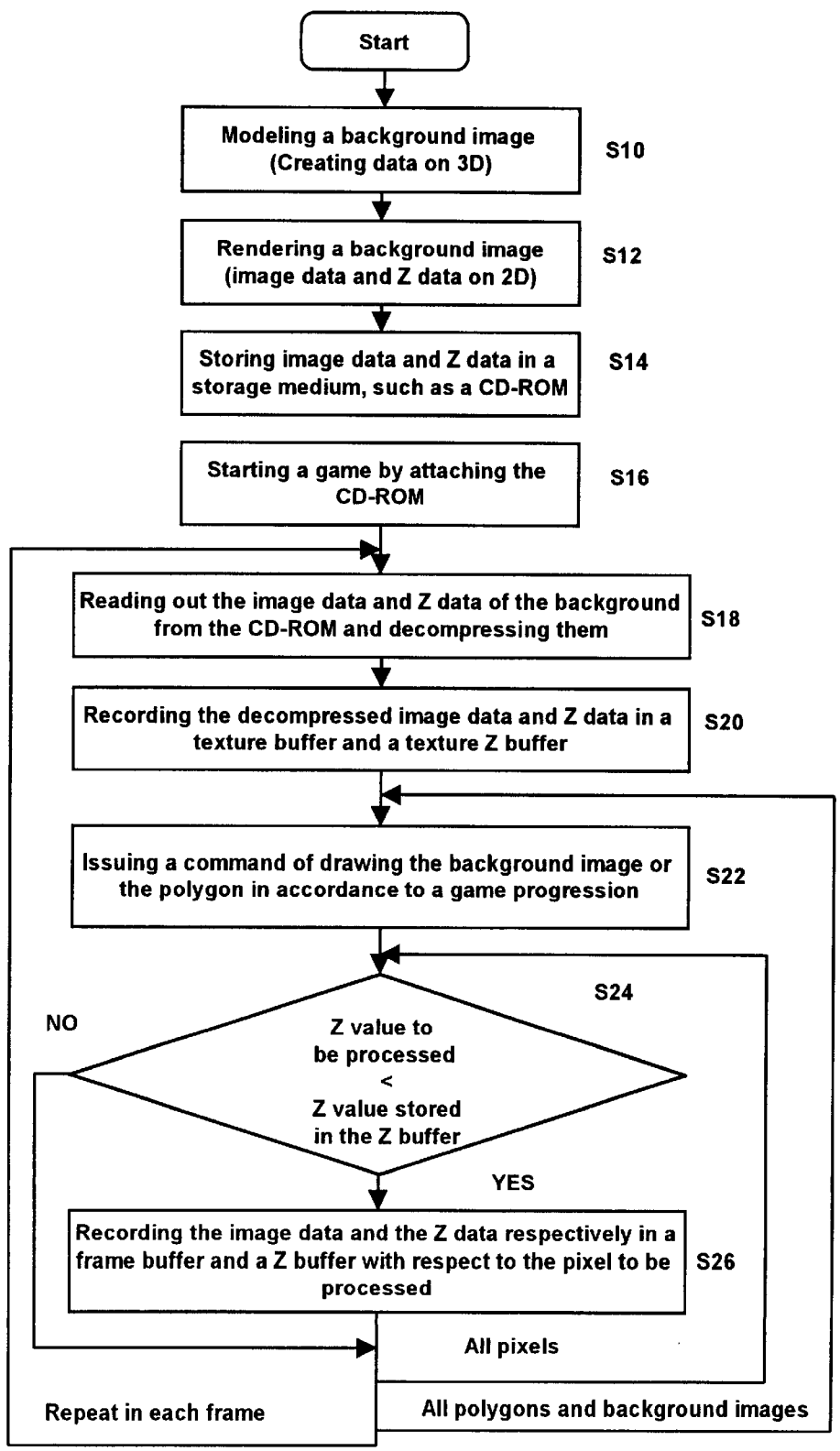
FIG. 4 is a flowchart of an image processing according to a first embodiment.

FIG. 4 is a flowchart of the image processing of the first embodiment. Image processing steps in the first embodiment will be now explained in detail according to the flowchart of FIG. 4. In this embodiment, a background image will be explained as an example of the pre-generated image. As a preliminary process, the background image, the image data and Z data thereof are generated in advance and are recorded in the external storage medium, such as a CD-ROM (S10, S12, S14).

When generating the background image by the use of computer graphics, a modeling process for the background image is executed (S10), at first. The modeling process for background image is a process to arrange objects, such as buildings, trees, mountains or roads, in three-dimensional coordinates and to create the shape of the objects. Therefore, coordinate data of the objects in the three-dimensional coordinates and attribute data for the objects is created through the modeling process. Next, the rendering process for the background image is executed by employing the data created above (S12). In the rendering process, a perspective conversion is conducted to convert the coordinate data in the three-dimensional coordinates to that in the two-dimensional coordinates, and color data is generated for each object. Therefore, according to the rendering process, image data composed by the color or pattern data and Z data indicating the depth in the screen in the two-dimensional coordinates are generated in each pixels of a predetermined unit. In the embodiment, the pixel of the predetermined unit does not necessarily correspond to pixel finally displayed on the monitor screen. For example, image data and Z data may be generated in a predetermined pixel unit of which resolution is lower than the pixels finally displayed on the monitor screen.

The background image is generated by computer graphic techniques in the above-described steps S10 and S12. After that, the pre-generated image data and Z data are recorded in the external storage medium, such as a CD-ROM (S14). The background image generation is finished here. After that, an image processing in the game device is executed according to steps S16 to S26 by using the external storage medium 30.

The external storage medium, CD-ROM 30, records a game program, texture data and the other attribute data for required objects in addition to the above-described image data and Z data of the background image. Before starting the game, the CD-ROM 30 is installed to the game device shown in FIG. 3 (S16), the game program, the texture data and the other attribute data for the objects stored in the CD-ROM are read-out to the internal work RAM 22 shown in FIG. 3 according to the installation of CD-ROM 30.

In FIG. 4, the image processing steps shown in the steps S18 to S26 are repeated in each frame of game image.

At first, the CPU 20 reads out the image data and Z data of the background image from the CD-ROM 30. As the data are usually compressed and stored, the data are read out to the work RAM 22 once and are decompressed (S18). The CPU 20 issues a command to the renderer 34 so that the decompressed image data and Z data are respectively recorded in the texture buffer 44 and the texture Z buffer 46. The renderer 34 stores the image data and Z data of the background image in the texture buffer 44 and the texture Z buffer 46, respectively (S20).

In the embodiment, the data of background image is texture data, which is color data under a white light or a predetermined light source, for example. Further, the Z data of background image indicates the depth in the screen based on a predetermined fixed viewpoint. When adding the Z data indicating the depth in the screen to the texture data of background image, it becomes possible to cope with the hidden surface deletion process which includes the comparison of Z data in the later rendering process, and to synthesize the real-timely generated object in the background image, with giving an impression of depth or distance.

As the game is in progress, the CPU 20 issues a command for drawing the background image or a command for drawing polygons forming the real-timely generated object (S22). These drawing commands are supplied to the renderer 34 via the system controller 26.

Figure 5:
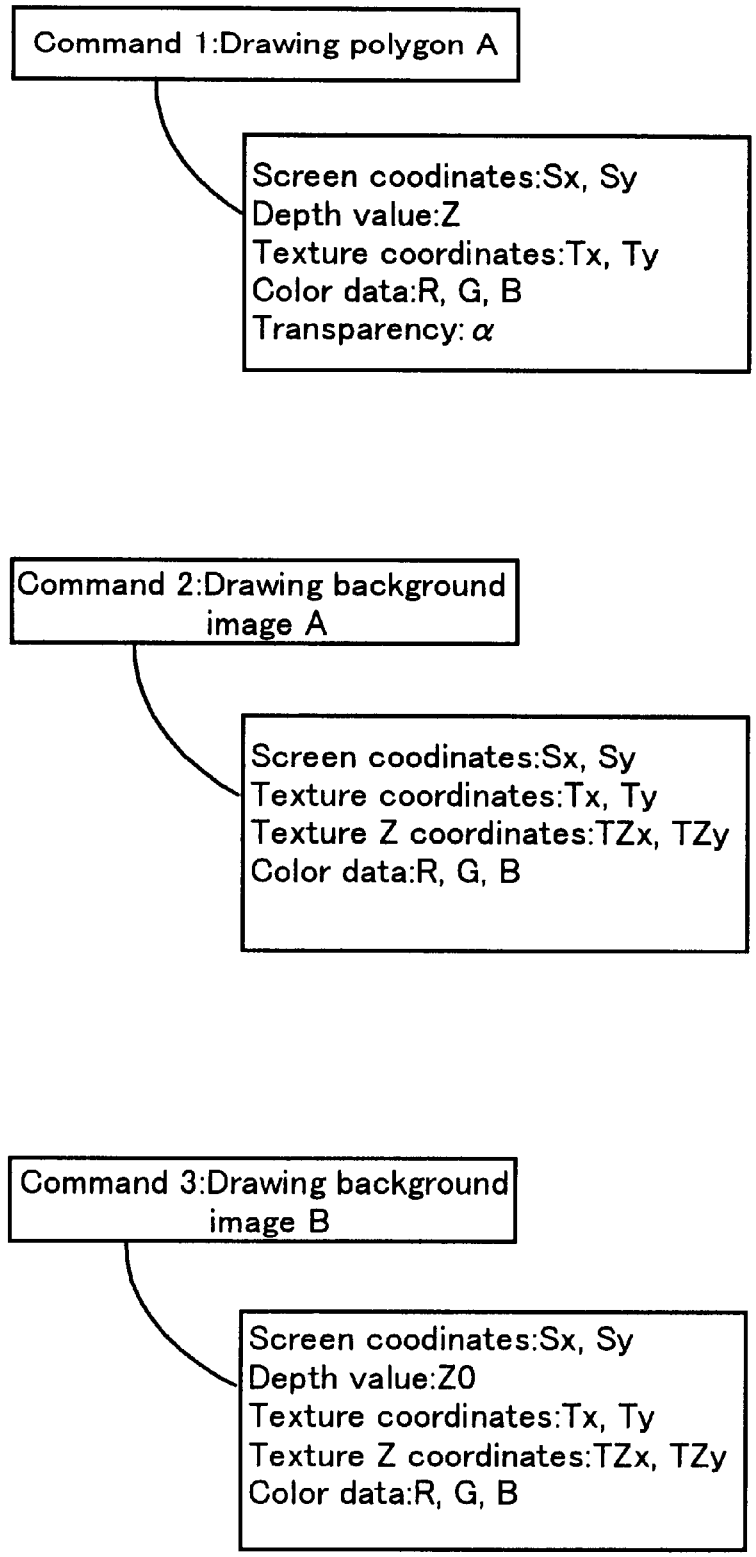
FIG. 5 shows an example of drawing commands.

FIG. 5 shows an example of the drawing commands. In FIG. 5, a command 1 of instructing to draw a polygon A and a command 2 of instructing to draw a background image A are shown. A command 3 will be explained in the later described embodiment. Screen coordinates Sx and Sy indicating a position of polygon on the display screen, a depth value Z (Z data) in the screen, coordinates Tx and Ty in the texture buffer 44 where texture data indicating a pattern of the polygon A is stored in, color data R, G, B of the polygon A, and a transparency α are attached as attribute data to the drawing command 1 of the polygon A forming the real-timely generated objects. The attribute data is given to each vertex of the polygon A, for example.

Screen coordinates Sx and Sy indicating a position in the screen where the background image A be displayed, texture coordinates Tx and Ty in the texture buffer 44 where the texture data indicating a pattern of the background image A is stored in, texture Z coordinates TZx and TZy in the texture Z buffer 46 where the Z data indicating the depth in the screen of each pixel is stored in, and the color data R, G, B of the background image A are attached as attribute data to a command 2 for instructing to draw the background image A. The attribute data are given to four vertexes, when the background image A is a square, for example.

Returning back to the flowchart of FIG. 4, the renderer 34 executes the hidden surface deletion process for comparing the Z data of the pixel to be processed with the Z data stored in the Z buffer 42, in response to the supplied drawing command (S24). When the Z data of the pixel in process indicates foremost in the screen, the renderer 34 generates the image data of the pixel to be processed in accordance with the texture data read out from the texture buffer 44, the given color data, transparency data, and etc. and records the image data of the pixel to be processed at the corresponding position in the frame buffer 40. The renderer 34 further records the Z data of the pixel to be processed at the corresponding position in the Z buffer 42 (S26).

With respect to the polygons of real-timely generated object, the Z data of each pixel in the polygon can be obtained by interpolating the Z data given to each vertex.

The Z data of pixel to be processed obtained in that way is compared with the Z data already written at the corresponding pixel position in the Z buffer (S24). When the Z data of pixel to be processed is smaller than (is positioned in front of or foremost) the Z data in the Z buffer 42, the image data of pixel to be processed is obtained by calculations, and the obtained image data is written to the frame buffer 40 (S26). On the other hand, for the drawing command of the background image, the renderer 34 obtains the Z data of pixel to be processed from the Z data stored in the texture Z buffer 46 without interpolation, which is performed for obtaining the Z data of the pixel in the normal polygon. The above-described steps S24 and S26 are performed by employing the Z data for the background image.

Figure 6:
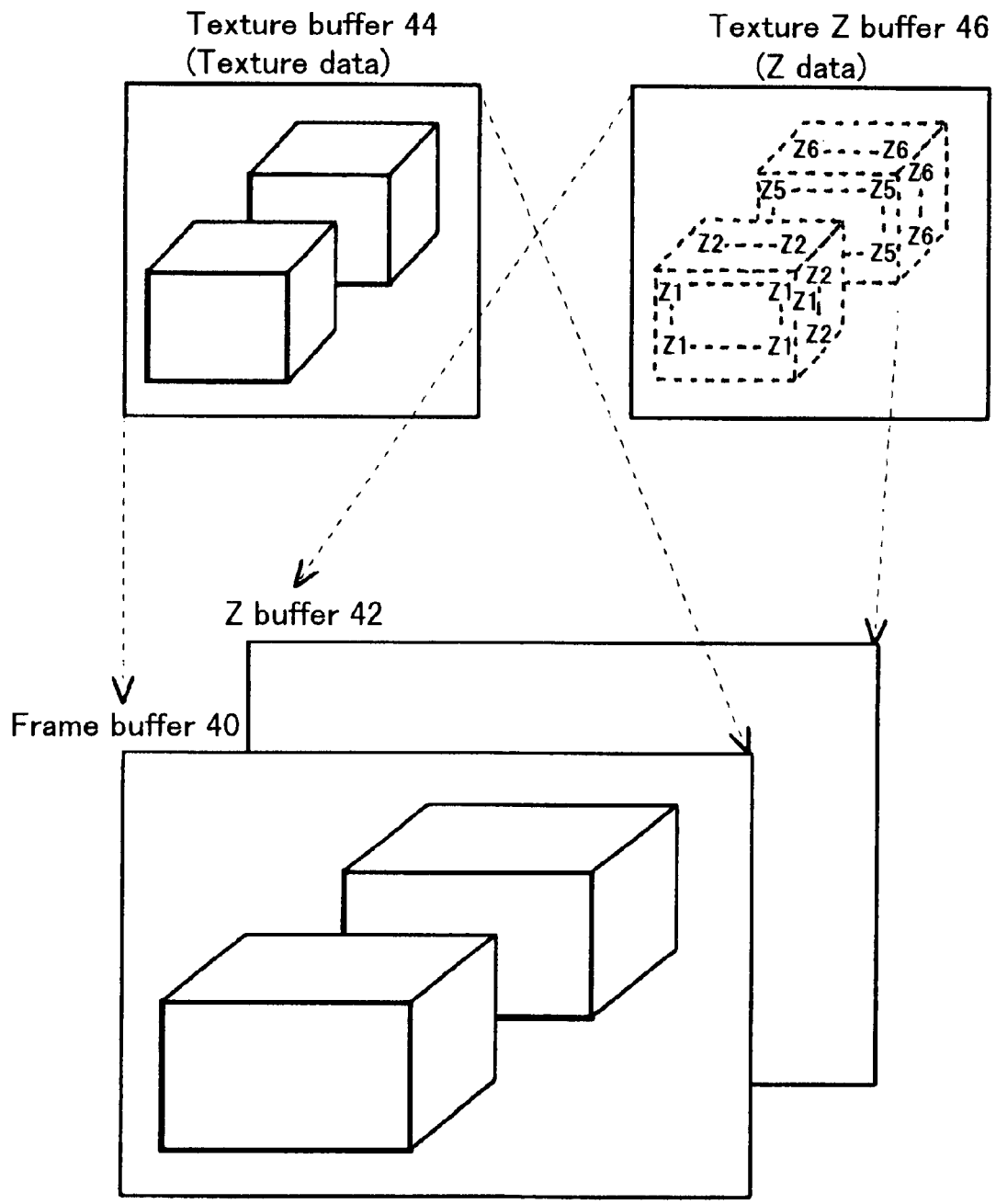
FIG. 6 is a first example showing a texture buffer memory and texture Z buffer memory of a background image.

FIG. 6 shows a texture buffer and a texture Z buffer of the background image. As described above, the texture data of background image is generated with a resolution less than that of the frame buffer 40 corresponding to the display screen in order to lighten loads on processing the background image. Similarly, in the texture Z buffer where the Z data of background image is stored in, the texture Z data is also generated with a resolution less than that of the Z buffer 42 corresponding to the display screen. In general, the image data and Z data are recorded in the frame buffer 40 and Z buffer 42 in each pixel, which corresponds to a pixel in the display screen. On the contrary, in the texture buffer and the texture Z buffer 46 of the background image, the image data and Z data of the background image are stored in each predetermined pixel unit called for "texel", for example, of which resolution is less than that of the pixel. When the background image is displayed on the full display screen, the renderer 34 generates the image data of the pixel unit in the display screen, of which resolution is higher, from the texture data read out from the texture buffer 44 by a calculation, and stores it in the frame buffer 40. In here, the image data means color data of pixel, i.e., data for gray scale level of RGB. Similarly to the texture data case, the renderer 34 generates the Z data in each pixel unit of the display screen, of which resolution is higher, in accordance with the Z data read out from the texture Z buffer 46, and stores it in the Z data buffer 42.

Figure 7:
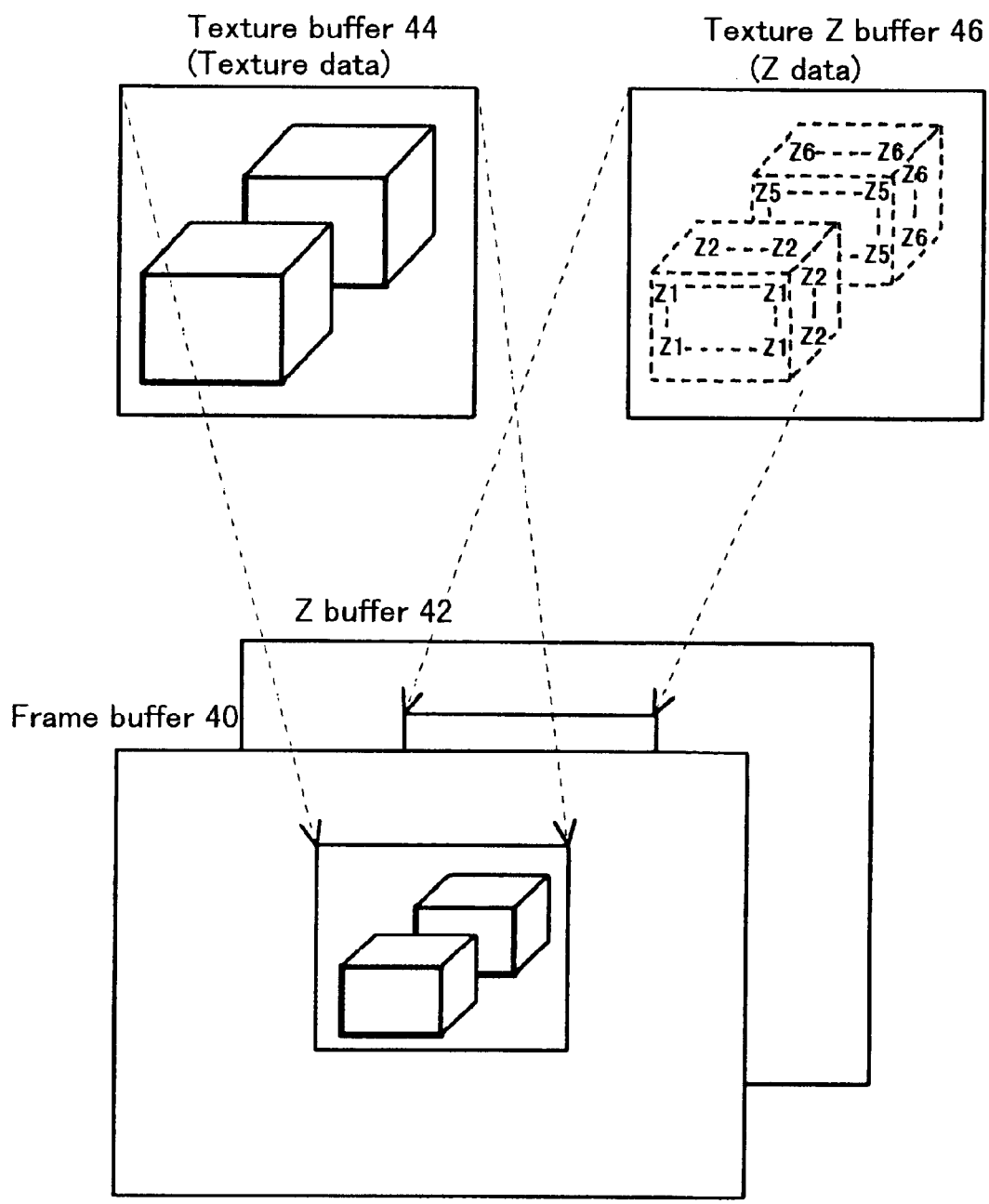
FIG. 7 is a second example showing a texture buffer memory and texture Z buffer memory of a background image.

FIG. 7 shows a texture buffer and a texture Z buffer of the background image. Shown is an example of writing an image having a smaller size than that of the texture data of background image to the frame buffer 40. In this case, the render 34 reads out the texture data corresponding to the background image from the texture buffer 44, lowers the resolution by an adaptable process, such as removing a part of the texture data, and writes it at a predetermined position in the frame buffer 40. The renderer 34 reads out the Z data of background image in the texture Z buffer 46, reduces the size in the same way, and records it at the corresponding position in the Z buffer 42.

Returning back to the flowchart of FIG. 4, the hidden surface deletion process (S24) of comparing the Z data and the process (S26) for respectively storing the image data and the Z data in the frame buffer 40 and the Z buffer 42, when the pixel to be processed is foremost in the display screen, are executed for all pixels of the polygon or background image specified by the drawing command. Additionally, the steps S22, S24 and S26 are executed from all polygons or all background images in each frame. When finishing the rendering process for all polygons and all background images in one frame, the renderer 34 transfers the image data stored in the frame buffer 40 to a monitor, not shown in the diagram, and displays the image on the monitor screen.

In the above-described flowchart, the step S18 is executed in each frame. It becomes possible to cope with the case where the background image differs in each frame by executing the above-described step S18 in each frame. Additionally, it becomes possible to lighten loads on the image processing by using the image data of background image as data in a texel unit and to draw the changed background image in the frame buffer by changing the size of background image to an desired size.

In the above-described image processing method of the first embodiment, fixed Z data is given for the background image. Therefore, the viewpoint position on the image processing must be fixed, as long as the same background image is used. A suitable hidden surface deletion process can be performed when fixing the viewpoint position and comparing the Z data of the background image based on the viewpoint with the Z data of polygon of the real-timely generated object, and therefore, an image of the object can be synthesized in the background image with giving an impression of depth or distance. Fixing the viewpoint position gives a certain limitation on the game image type. However, even through the viewpoint position is not changed, an image for a viewpoint position moved forward or backward can be obtained imitatively by changing the viewpoint angle. Although the viewpoint position must be fixed for one background image in the first embodiment, an image at the time when the position of viewpoint is moved frontward or backward can be generated by zoom-in or zoom-out techniques changing the viewpoint angle.

Figure 1A:
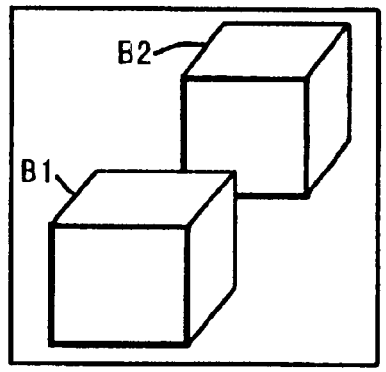
FIGS. 1A, 1B, 1C and 1D are first explanatory diagrams of the conventional problems on the synthesized images.
Figure 1B:
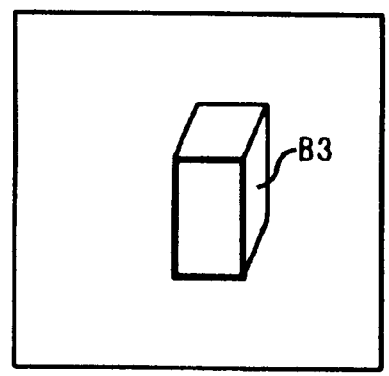
Figure 1C:
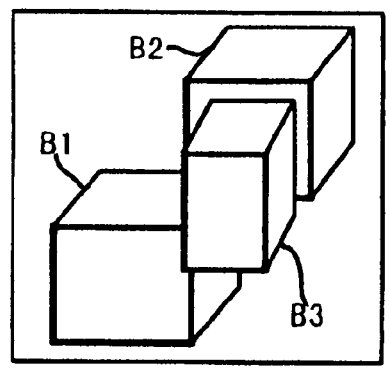
Figure 1D:
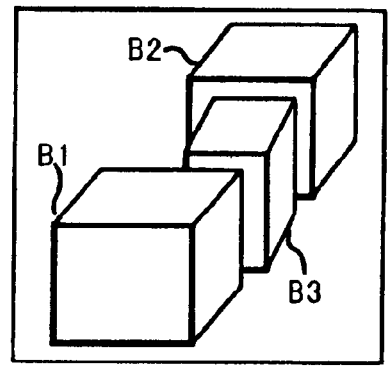
Figure 8:
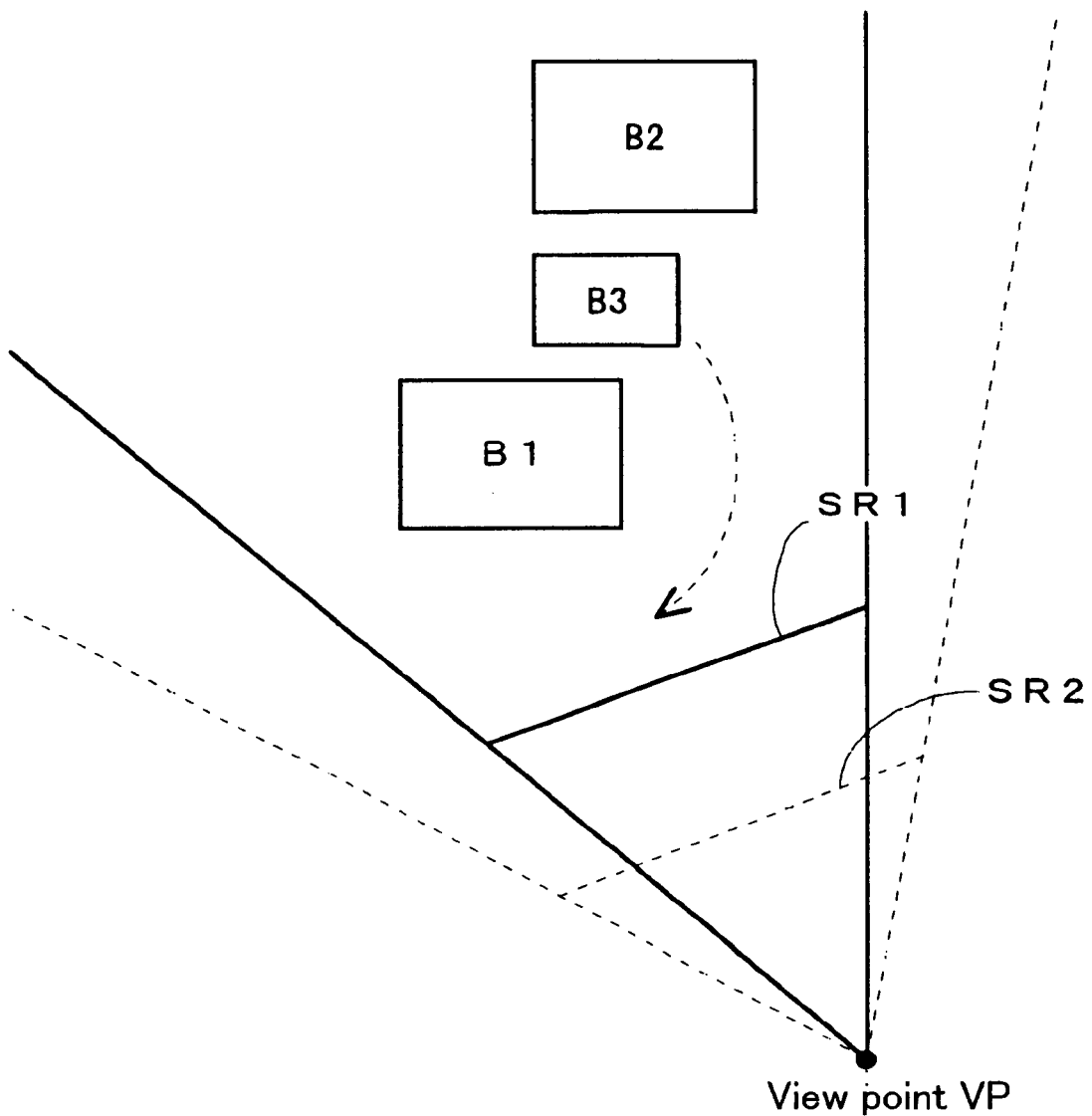
FIG. 8 is an explanatory diagram of zoom-in or zoom out process.

FIG. 8 is an explanatory diagram of the zoom-in and zoom-out techniques. In FIG. 8, buildings B1, B2 and B3 in the synthesized image shown in FIG. 1D are respectively arranged therein. It is assumed that a viewpoint angle, which is shown by a bold line of FIG. 8, is set for a viewpoint VP. In this case, the buildings B1, B2 and B3 are displayed on a screen SR1 shown by a bold line of FIG. 8. It is now assumed that the building B3 moves towards the viewpoint VP side, as shown by a broken arrow of FIG. 8. When the real-timely generated object moves foremost in the screen, the viewpoint VP is moved backward according to the movement of the object, in general. However, since the viewpoint VP can not be moved in the first embodiment, the zoom-out process extending the viewpoint angle as shown by broken lines of FIG. 8 is performed, the moved building B3, the buildings B1 and B2 being originally in the background image are displayed on a screen SR2. When the building B3 further moves back to the original position, the zoom-in process is executed again, as shown by the bold lines of FIG. 8. An image similar to that obtained by moving the viewpoint VP forward or backward can be imitatively obtained without moving the viewpoint VP by employing the zoom-in and zoom-out techniques.

Figure 9:
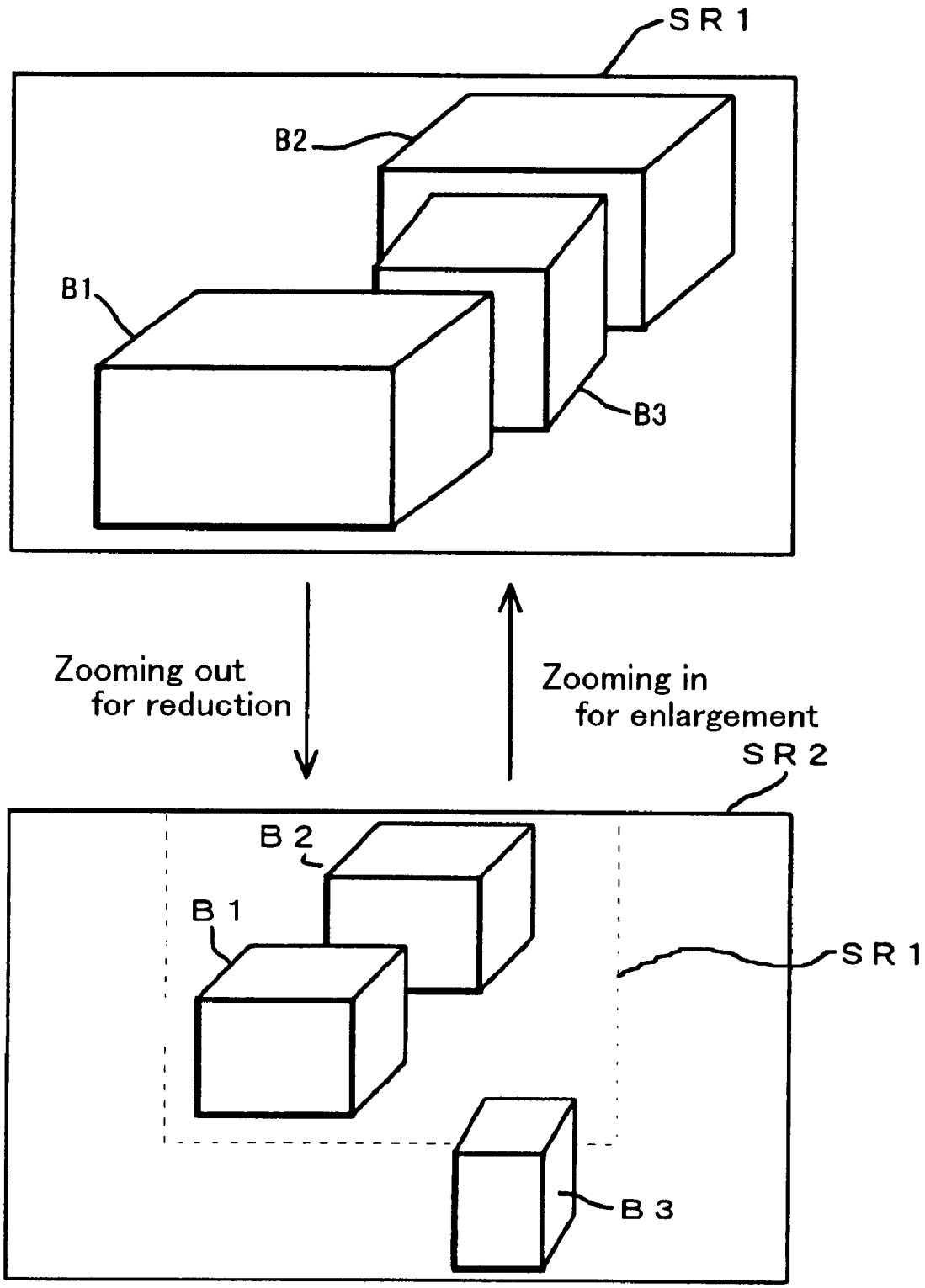
FIG. 9 shows an example of images displayed on screens SR1 and SR2 shown in FIG. 8.

FIG. 9 shows an example of images displayed on the screens SR1 and SR2 shown in FIG. 8. As shown by arrows of FIG. 9, it is possible to generate an image as the screen SR2 displayed, in which the large building B3 is positioned in front of the buildings B1 and B2 by executing the zoom-out process, from an image, as shown on the screen SR1, in which the buildings B1, B2, and B3 are displayed on the full screen. On the contrary, an enlarged image, as shown on the screen SR1 in FIG. 9, can be formed from the image shown in the screen SR2 by executing the zoom-in process. By employing the methods shown in FIGS. 6 and 7, the background image can be drawn in the enlarge image as the screen SR1 of FIG. 9 and the reduced image as the screen SR2 of FIG. 9.

Figure 2:
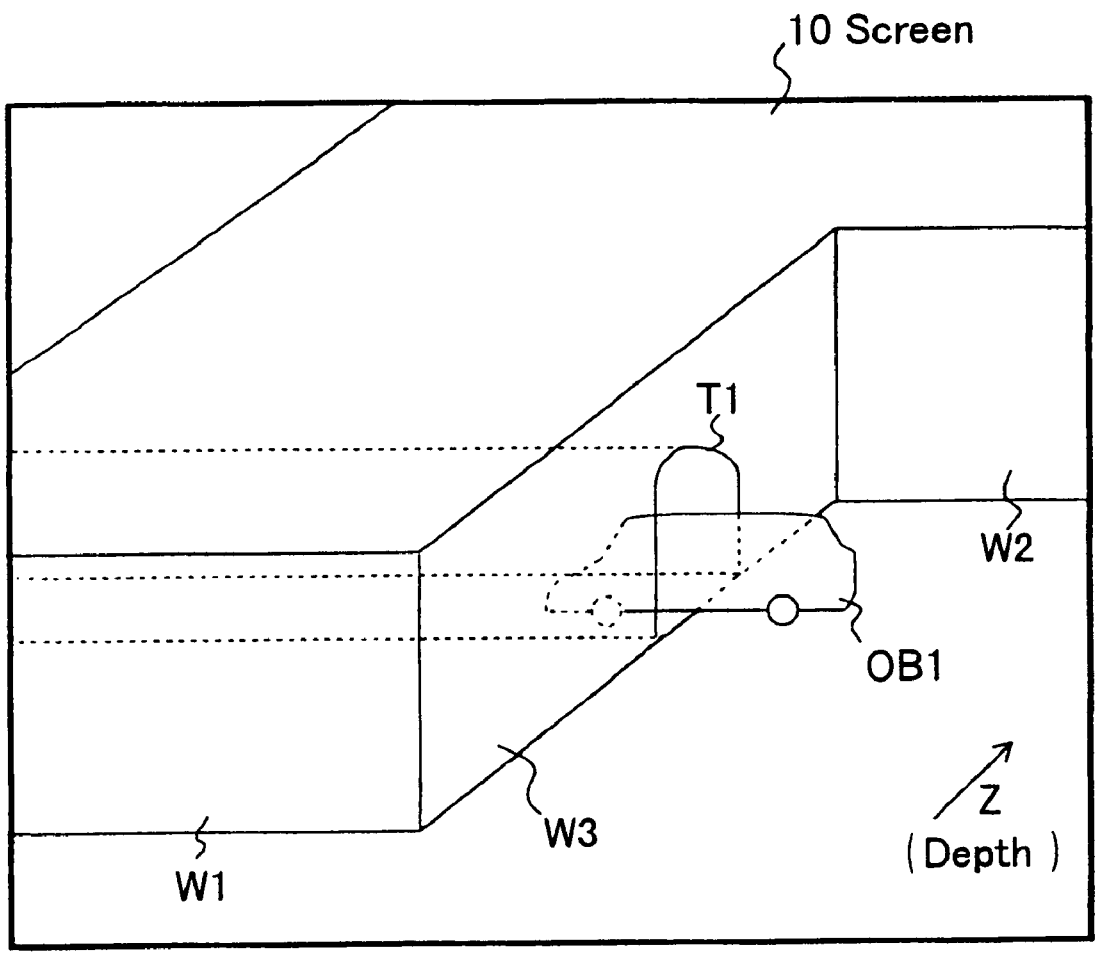
FIG. 2 is a second explanatory diagram of the conventional problems on the synthesized image.

In the above-described first embodiment, by including the Z data indicating the depth in addition to the texture data, which is color data of the image, to the pre-generated background image, a real-timely generated object can be entered at a desired position along the depth direction in the background image, as shown in FIG. 2. Although the Z data for the walls W1 and W2 are constant in the case of the background image shown in FIG. 2, different Z data in each pixel is given to the Z data for wall W3 extending along the depth direction. Therefore, it is possible to generate a synthesized image in which the part of the object OB1 outside the tunnel T1 in FIG. 2 is displayed and another part of the object in a tunnel T1 is not displayed, can be generated by executing the hidden surface deletion process due to the comparison of the Z data at the step S24 shown in the flowchart of FIG. 4. Additionally, since the background image can be always treated as a plain polygon, thus it is prevented from giving any load for extra calculations in the image processing.

Figure 10A:
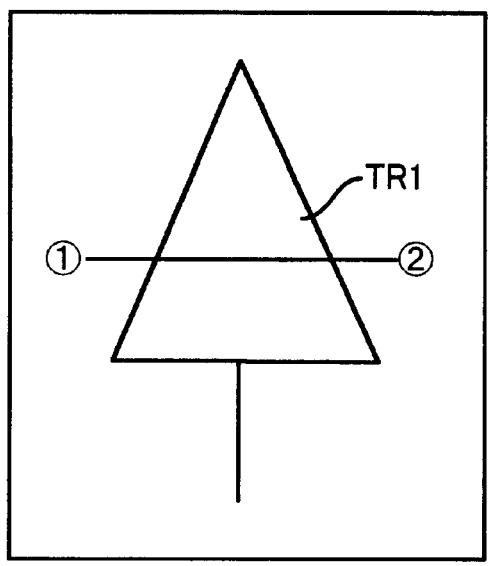
FIGS. 10A and 10B are explanatory diagrams of the background image in the second embodiment.
Figure 10B:
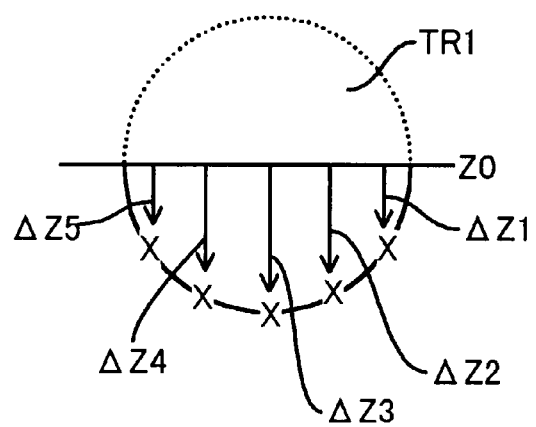

FIGS. 10A and 10B are explanatory diagrams of the background image in the second embodiment. In the first embodiment, the Z data indicating the depth for the fixed viewpoint is given to the pre-generated background image. In the second embodiment, Z data is given as the Z data of the pre-generated background image as displacements $\Delta Z1$ to $\Delta Z5$ displaced from a predetermined reference position $Z0$ in order to remove a limitation of fixing the viewpoint position.

The example shown in FIG. 10 is an object of conical tree. The background image shown in FIG. 10A includes a conical tree TR1. FIG. 10B explains Z data of the object TR1 shown in FIG. 10A. Shown is a cross-sectional surface ($\hat{1}$–$\hat{2}$) of the tree TR1, which is an object in the background image, and displacements $\Delta Z1$ to $\Delta Z5$ from a predetermined reference position $Z0$ at the tree surface in FIG. 10B. More specially, the displacement data $\Delta Z$ from the reference position $Z0$ at a half circle shown by a bold line is given as Z data. As shown in FIG. 10B, since Z data from the viewpoint to the reference place $Z0$ is given when the viewpoint is determined, the Z value of each pixel in the background image can be calculated through the Z data to the reference position $Z0$ and the Z data indicating the displacement from the reference position $Z0$.

In the second embodiment, the CD-ROM 30 stores the displacement data from the reference position $Z0$ as Z data of the background image. The renderer 34 records the Z data read out from the CD-ROM 30 in the texture Z buffer 46. Screen coordinates Sx and Sy indicating a position of background image in the display screen and Z data $Z0$ indicating the depth in the display screen are given as attribute data to a drawing command of the background image in the second embodiment, like the command 3 shown in FIG. 5. Texture coordinates, texture Z coordinates and color data are given as the other attribute data, similarly to the command 2 for drawing the background image in the first embodiment. In this way, the Z data $Z0$ indicating the depth is given to the command 3 for drawing the background image. Therefore, the Z data of background image based on the currently processing viewpoint VP can be obtained from the Z data $Z0$ and the Z data $\Delta Z1$ to $\Delta Z5$ indicating displacements from the reference position $Z0$ read out from the texture Z buffer 46 as follows:

$$z = z0 + \Delta z$$

As described above, the displacement data $\Delta Z$ is employed as the Z data of background image in the second embodiment, and the Z data $Z0$ indicating the depth is given as attribute data to the command for drawing the background image. The other features are the same as those of the first embodiment. Therefore, the flowchart of image processing shown in FIG. 4 is applicable to the second embodiment as it is.

Figure 11A:
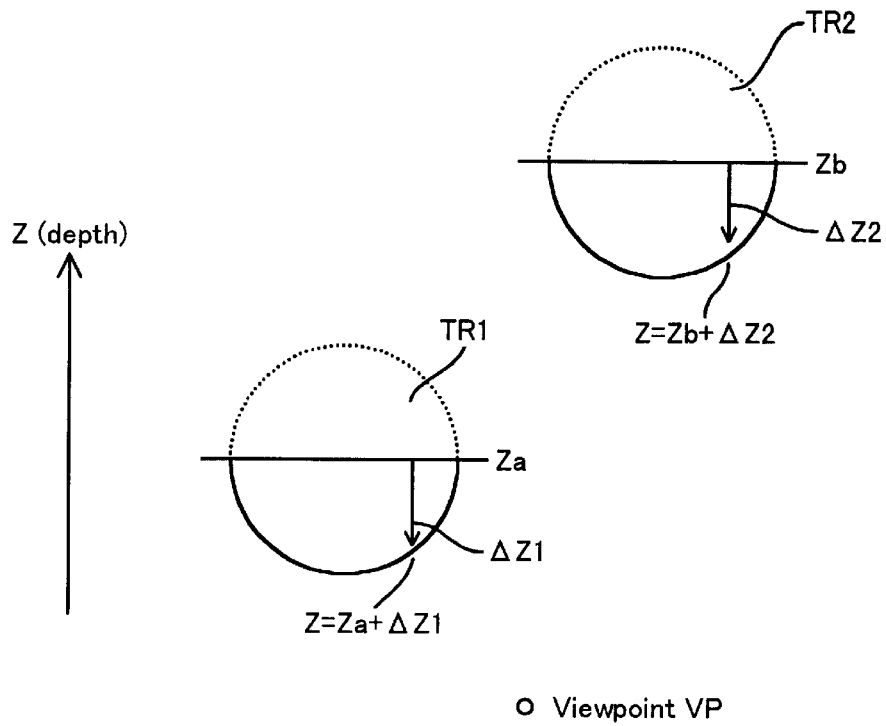
FIGS. 11A and 11B show examples, when employing plural background images.
Figure 11B:
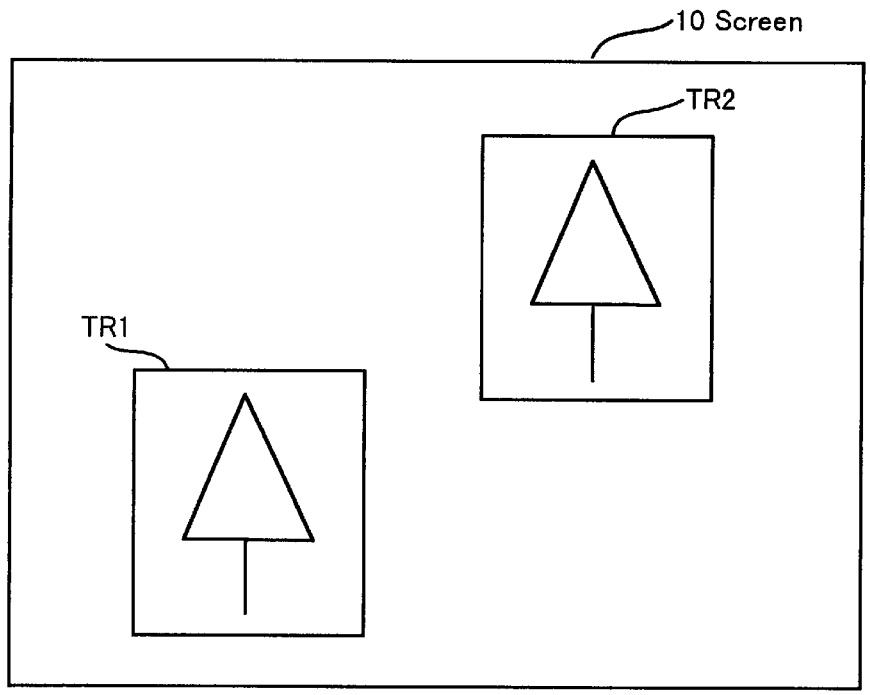

FIGS. 11A and 11B show examples when employing plural background images. As described above, the plural background images can be arranged at different depths along the depth direction by employing the displacement data from the reference position as Z data of each background image.

In FIG. 11A, a background image of tree TR1 and a background image of tree TR2 are respectively foremost and rearmost along with the depth direction Z. To arrange the background image, Z data Za and Zb indicating the depth are given as attribute data to a command for drawing the background image. An example where two background images of trees TR1 and TR2 are drawn on a screen 10 is shown in FIG. 11B. When making the shape of the tree TR2, which is rearmost in the depth direction, be small, the shape can be displayed in reduced size by properly omitting a part of the texture data read out from the texture buffer 44, as explained above.

As described above, in the second embodiment, it becomes possible to draw the background image at the desired position in the display screen by changing the viewpoint VP in each frame. By giving the Z data to the background image, an image of the object can be synthesized in the background image with giving an impression of depth or distance by using the hidden surface deletion process of comparing the Z data with the Z value of the real-timely generated object.

Figure 12:
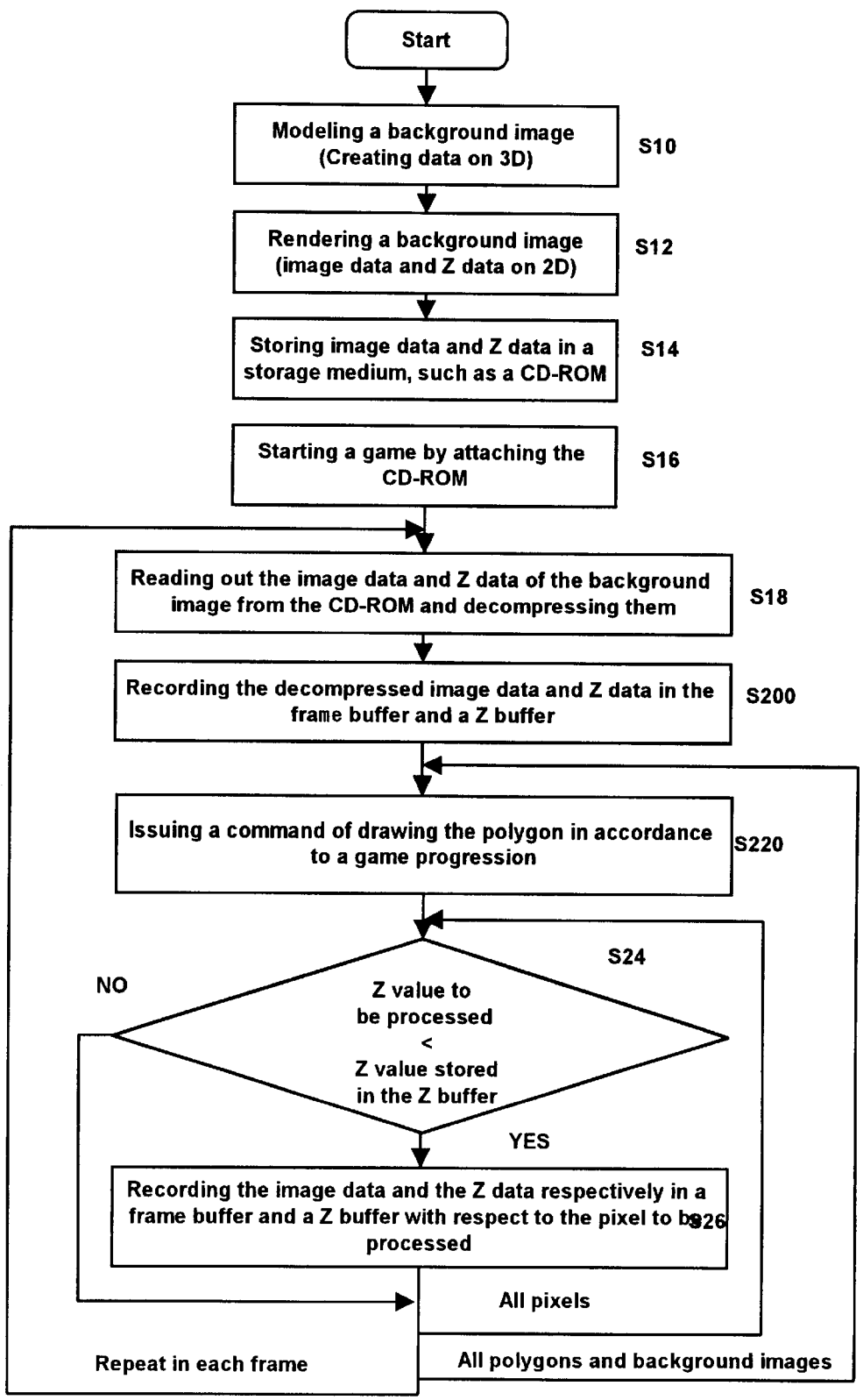
FIG. 12 is a flowchart of an image processing in the third embodiment.

FIG. 12 is a flowchart of image processing in the third embodiment. In FIG. 12, the same step numbers are used to denote corresponding or identical steps in the flowchart of FIG. 4. Therefore, the steps S10 to S18 in FIG. 12 are the same as those shown in FIG. 4. The steps S20 and S22 in FIG. 12 are respectively replaced into the steps S200 and S220 in FIG. 12.

In the third embodiment, the texture data and Z data of the background image are not stored in the texture buffer 44 and the texture Z buffer 46 of the game device, instead, the data read out and decompressed from the external storage medium 30 are recorded in the frame buffer 40 and the Z data buffer 42 of the game device, as they are. Therefore, the image data indicating color data of the background image and the Z data indicating the depth of the background image are generated for each pixel in the screen, and are recorded in the external storage medium 30 in the third embodiment. And, it is a premise that the position and angle of viewpoint for the image processing are fixed.

The above-described third embodiment is more effective to animation whose images are different for each frame and whose size is fixed like a movie. In other words, there is no need to store the data of background image stored in the external storage medium 30 in a texture buffer or texture Z buffer once, thus processes can be performed more effectively.

The processes will be now explained in accompanying to FIG. 12. The steps S10, S12 and S14 are modeling the background image, rendering the background image and recording the generated image data and Z data in a storage medium, like the first and second embodiments. These steps are performed in advance. Then, the game is started after the CD-ROM 30 is installed to the game device (S16). At first, the image data and Z data of the background image are read out from the CD-ROM 30 and the read data are decompressed (S18). The CPU 20 supplies the decompressed image data and Z data to the renderer 34 via the system controller 26 so as to record them in the frame buffer 40 and the Z data buffer 42, as they are (S200).

Then, the CPU 20 issues a command for drawing polygons of a real-timely generated object, in response to operation input signals provided in synchronism with the game progression, and gives them to the renderer 34 (S220). Since the drawing command means only a command of drawing the real-timely generated polygons, a drawing command for the background image is not generated here. Since the data of the background image is already recorded in the frame buffer 40 and the Z data is recorded in the Z buffer 42, the renderer 34 obtains the Z value of pixel in the polygon by interpolation, in response to the command of drawing the polygon, executes the hidden surface deletion process by comparing the Z value of pixel of the polygon with the Z value in the Z buffer 42 (S24), obtains the image data of the pixel only when the processing pixel is foremost in the screen, and updates the obtained image data at the corresponding position in the frame buffer 40. Concurrently, the Z data of the pixel is updated at the corresponding position in the Z buffer 42 (S26). The above-described steps S24 and S26 are executed for real-timely generated polygons. When finishing the steps S220, S24 and S26 for all polygons in one frame, the renderer 34 sends the image data in the frame buffer 40 to a monitor screen, not shown in the diagram, and displays the game image.

As is explained above, although there is a limitation such that a position and an angle of viewpoint are fixed on the image processing in the third embodiment, since image data and Z data of the pre-generated background image are stored in a frame buffer 40 and a Z buffer 42, without passing through a texture buffer and a texture Z buffer, it becomes possible to make easy and simplify the image processing for the background image.

In the above-described embodiments, the image processing is performed by employing hardware including a rendering circuit like a game device shown in FIG. 3. However, the image processing method according to the present invention can be realized by software using a general-purpose personal computer. In this case, the general-purpose computer executes a program stored in a computer-readable storage medium to execute the image processing steps S18 to S26 or image processing steps S18, S220, S24 and S26 shown in FIG. 4 or 12, thereby the same image processing can be realized.

Although a background image generated by computer graphics is explained as an example of a pre-generated image, the present invention is not restricted to that. In the present invention, it is possible to synthesize an image with an impression of distance when texture data and Z data is given to a pre-generated image, like a movie or animation. The pre-created image is not restrictive to data in an external storage medium, such as a CD-ROM, but can be data obtained through telecommunications or data generated by game.

The above-described texture data is color data for a pattern under a white light, for example, and if an environment light is white, the texture data is color data (image data) which can be written to a frame buffer, as it is. However, when the image data is stored in the texture buffer and is used for image processing as the texture data, it is suitable to call it as texture data.

As is explained above, according to the present invention, since Z data indicating the depth in a display screen is generated and recorded in addition to the texture data, with respect to the pre-generated background image, it becomes possible to use the Z data of a background image to execute a hidden surface deletion process including a comparison the Z data with Z data of a real-timely generated image.

Accordingly, the real-timely generated object can be synthesized in one background image with giving an impression of depth or distance. Additionally, as depth data is given to the background without increasing number of the background image, extra loads are not given to the image processing.

Further, according to the present invention, since a displacement from a predetermined reference position is used as Z data for the pre-generated image, by giving Z data indicating the depth in the screen of the image when drawing the image, it becomes possible to draw the image at the position and to obtain the Z data of the image from the given Z data and the displacement. Therefore, it becomes possible to perform the image processing while a viewpoint for the image processing is being changed at a desired position. The image of the real-timely generated objects can be synthesized with giving an impression of depth or distance in this case also.

What is claimed is:

1. An image processing method in a game or a simulation for synthesizing a pre-generated first background image and a real time generated second image to be integrated within said background image, in which first image data and first Z data indicating a depth in screen are pre-generated in a predetermined pixel unit as data of the first background image, the method comprising:

recording in a first buffer the data of the pre-generated first background image having first image data and first Z data without generating the data of the pre-generated first background image in real time during a progress of the game or the simulation, said first Z data including at least two different Z values;

generating second image data, including Z data of said second image in response to a real time instruction for generating a polygon as said second image, said real time instruction being generated during the progress of the game or the simulation; and synthesizing said pre-generated first background image and said real time generated second image by recording, in a frame buffer, data of the first or the second image, which is foremost in the screen, according to said Z data of the second image and the first Z data of the first image at a corresponding pixel position in the screen, wherein said second image is integrated within said background image so that a first portion of the second image is positioned at a front side of the first background image and a second portion of the second image is positioned at a back side of the first background image.

2. The image processing method according to claim 1, wherein said act of recording comprises:

recording in said first buffer said first Z data indicating that a first portion of the first image is positioned at a front side of the second image at a first corresponding pixel position; and a second portion of the first image is positioned at a back side of the second image at a second corresponding pixel position.

3. An image processing method in a game or a simulation for synthesizing a pre-generated first background image and a real time generated second image to be integrated within said background image, in which a Z buffer for recording Z data indicating a depth in a screen of an image to be displayed is used, and Z data of an image to be processed is compared with Z data stored in the Z buffer so as to record the image data to be processed, which is foremost in the screen, in a frame buffer, the method comprising the steps of:

(a) recording in a first buffer the data of the pre-generated first background image having first image data and first Z data without generating the data of the pre-generated first background image in real time during a progress of the game or the simulation, said first Z data including at least two different Z values;

(b) comparing the Z data stored in the Z buffer with the first Z data stored in the first buffer, and drawing the first image data stored in the first buffer at a predetermined position in the frame buffer, when the first image is foremost in the screen;

(c) generating second image data including Z data of said second image in response to a real time instruction for generating a polygon as said second image, said real time instruction being generated during the progress of the game or the simulation; and (d) synthesizing said pre-generated first background image and said real time generated second image by comparing the Z data stored in the Z buffer with said Z data of the second image, and drawing said second image data of the second image at a predetermined position in the frame buffer, when the second image is foremost in the screen, wherein said second image is integrated within said background image so that a first portion of the second image is positioned at a front side of the first background image and a second portion of the second image is positioned at a back side of the first background image.

4. The image processing method according to claim 3, wherein the step (b) includes recording in the frame buffer the first image data obtained by enlarging, reducing or varying the first image.

5. The image processing method according to claim 3, wherein the step (d) includes recording in the frame buffer image data of pixels in a polygon forming the second image.

6. The image processing method according to claim 3, wherein said act of recording comprises:

recording in said first buffer said first Z data indicating that a first portion of the first image is positioned at a front side of the second image at a first corresponding pixel position; and a second portion of the first image is positioned at a back side of the second image at a second corresponding pixel position.

7. An image processing method in a game or a simulation for synthesizing a pre-generated first background image with a real time generated second image to be integrated within said background image, in which a Z buffer for recording Z data indicating a depth in a screen of an image to be displayed is used, and the Z data of a pixel to be processed is compared with the Z data recorded in the Z buffer so as to record the image data, which is foremost in the screen, in a frame buffer, the method comprising the steps of:

(a) recording data of the pre-generated first background image having first image data and first Z data in a first buffer without generating the data of the pre-generated first background image in real time during a progress of the game or the simulation, said first Z data including at least two different Z values;

(b) comparing the Z data recorded in the Z buffer with the Z data of the first background image generated from the first Z data, in response to an instruction of drawing the first image, and recording the first background image data generated from the first image data in the frame buffer, when the pixel to be processed of the first background image is foremost in the screen; and (c) generating second image data including Z data of said second image in response to a real time instruction of drawing a polygon forming the second image, said real time instruction being generated during the progress of the game or the simulation, and synthesizing said pre-generated first background image and said real time generated second image by comparing the Z data recorded in the Z buffer with said Z data of a pixel in the real time generated polygon, and recording the second image data of the polygon at a corresponding position in the frame buffer, when the pixel in the polygon is foremost in the screen, wherein said second image is integrated within said background image so that a first portion of the second image is positioned at a front side of the first background image and a second portion of the second image is positioned at a back side of the first background image.

8. The image processing method according to claim 7, wherein said step (b) further comprises:

comparing the Z data recorded in the Z buffer with the Z data of the first image generated from the texture data, in response to an instruction of drawing the first image, wherein said instruction comprises:

at least one of position data, texture data, Z data and color data of said first image.

9. The image processing method according to either of claim 7 or 8, wherein at least the steps (b) and (c) are repeated in each frame.

10. The image processing method according to claim 7, wherein the texture Z data includes a displacement from a predetermined position for the first image, and wherein said step (b) further comprises: comparing the Z data recorded in the Z buffer with the Z data of the first image generated from the texture data, in response to an instruction of drawing the first image, wherein said instruction further comprises:

position Z data indicating the depth in the screen of the first image, and wherein the Z data of the first image is generated from said position Z data and said texture Z data.

11. The image processing method according to claim 7, wherein said act of recording comprises:

recording in said first buffer said first Z data indicating that a first portion of the first image is positioned at a front side of the second image at a first corresponding pixel position; and a second portion of the first image is positioned at a back side of the second image at a second corresponding pixel position.

12. A computer-readable storage medium storing a program for causing a computer to execute an image processing method in a game or a simulation for synthesizing a pre-generated first background image and a real time generated second image to be integrated within said background image, in which first image data and first Z data indicating a depth in screen are pre-generated in a predetermined pixel unit as data of the first background image, the method comprising:

recording in a first buffer the data of the pre-generated first background image having first image data and first Z data without generating the data of the pre-generated first background image in real time during a progress of the game or the simulation, said first Z data including at least two different Z values;

generating second image data, including Z data of said second image in response to a real time instruction for generating a polygon as said second image, said real time instruction being generated during the progress of the game or the simulation; and synthesizing said pre-generated first background image and said real time generated second image by recording, in a frame buffer, data of the first image or the second image which is foremost in the screen, according to said Z data of the second image and the first Z data of the first image at a corresponding pixel position in the screen, wherein said second image is integrated within said background image so that a first portion of the second image is positioned at a front side of the first background image and a second portion of the second image is positioned at a back side of the first background image.

13. The storage medium according to claim 12, wherein said act of recording comprises:

recording in said first buffer said first Z data indicating that a first portion of the first image is positioned at a front side of the second image at a first corresponding pixel position; and a second portion of the first image is positioned at a back side of the second image at a second corresponding pixel position.

14. A computer-readable storage medium storing a program for causing a computer to execute an image processing method in a game or a simulation for synthesizing a pre-generated first background image and a real time generated second image to be integrated within said background image, in which a Z buffer for recording Z data indicating a depth in a screen of an image to be displayed is used, and Z data of an image to be processed is compared with Z data stored in the Z buffer so as to record the image data to be processed, which is foremost in the screen, in a frame buffer, the method comprising:

(a) recording in a first buffer the data of the pre-generated first background image having first image data and first Z data without generating the data of the pre-generated first background image in real time during a progress of the game or the simulation, said first Z data including at least two different Z values;

(b) comparing the Z data stored in the Z buffer with the first Z data stored in the first buffer, and drawing the first image data stored in the first buffer at a predetermined position in the frame buffer, when the first image is foremost in the screen;

(c) generating second image data, including Z data of said second image in response to a real time instruction for generating a polygon as said second image, said real time instruction being generated during the progress of the game or the simulation; and (d) synthesizing said pre-generated first background image and said real time generated second image by comparing the Z data stored in the Z buffer with said Z data of the second image, and drawing said second image data, of the second image, at a predetermined position of the frame buffer, when the second image is foremost in the screen, wherein said second image is integrated within said background image so that a first portion of the second image is positioned at a front side of the first background image and a second portion of the second image is positioned at a back side of the first background image.

15. The storage medium according to claim 14, wherein said act of recording comprises:

recording in said first buffer said first Z data indicating that a first portion of the first image is positioned at a front side of the second image at a first corresponding pixel position; and a second portion of the first image is positioned at a back side of the second image at a second corresponding pixel position.

16. A computer-readable storage medium storing a program for causing a computer to execute an image processing method in a game or a simulation for synthesizing a pre-generated first background image with a real time generated second image to be integrated within said background image, in which a Z buffer for recording Z data indicating a depth in a screen of an image to be displayed is used, and the Z data of a pixel to be processed is compared with the Z data recorded in the Z buffer so as to record the image data, which is foremost in the screen, in a frame buffer, the method comprising:

(a) recording data of the pre-generated first background image having first image data and first Z data in a first buffer without generating the data of the pre-generated first background image in real time during a progress of the game or the simulation, said first Z data including at least two different Z values;

(b) comparing the Z data recorded in the Z buffer with the Z data of the first background image generated from the first Z data, in response to an instruction of drawing the first background image, and recording the first background image data generated from the first image data in the frame buffer, when the pixel to be processed of the first background image is foremost in the screen; and (c) generating second image data including Z data of said second image in response to a real time instruction of drawing a polygon forming the second image, said real time instruction being generated during the progress of the game or the simulation and synthesizing said pre-generated first background image and said real time generated second image by comparing the Z data recorded in the Z buffer with said Z data of a pixel in the real time generated polygon, and recording the second image data of the polygon at a corresponding position in the frame buffer, when the pixel in the polygon is foremost in the screen, wherein said second image is integrated within said background image so that a first portion of the second image is positioned at a front side of the first background image and a second portion of the second image is positioned at a back side of the first background image.

17. The storage medium according to claim 16, wherein the texture Z data includes a displacement from a predetermined position for the first image, and wherein said step (b) further comprises: comparing the Z data recorded in the Z buffer with the Z data of the first image generated from the texture data, in response to an instruction of drawing the first image, wherein said instruction further comprises:

position Z data indicating the depth in the screen of the first image, and wherein the Z data of the first image is generated from said position Z data and said texture Z data.

18. The storage medium according to claim 16, wherein said act of recording comprises:

recording in said first buffer said first Z data indicating that a first portion of the first image is positioned at a front side of the second image at a first corresponding pixel position; and a second portion of the first image is positioned at a back side of the second image at a second corresponding pixel position.

* * * * *